3,558,578
SOLUTION GRADE PVC—COPOLYMERS PREPARED BY SUSPENSION POLYMERIZATION EXHIBITING ENHANCED LIGHT STABILITY AND LOW HAZE

Paul Kraft, Yonkers, William F. Keller, Dobbs Ferry, and Siegfried Altscher, Monsey, N.Y., assignors to Stauffer Chemical Company, New York, N.Y., a corporation of Delaware
No Drawing. Filed Dec. 4, 1968, Ser. No. 782,733
The portion of the term of the patent subsequent to May 12, 1987, has been disclaimed
Int. Cl. C08f 15/24, 15/30
U.S. Cl. 260—87.1        10 Claims

ABSTRACT OF THE DISCLOSURE

A method is provided for the suspension of polymerization of "solution grade" vinyl chloride/vinyl acetate copolymer exhibiting enhanced ultraviolet light stability and relatively low haze. The method comprises polymerizing vinyl chloride and from about 1 to 25% by weight vinyl acetate in the presence of a catalytic amount of a "hot catalyst," from about 0.03 to about 0.3% of a methyl cellulose suspending agent and either benzene or toluene. The reaction is conducted at a temperature of from 0° C. to 90° C. The hot catalyst has a ten hour half-life temperature of less than 60° C.

---

The present invention relates to the preparation of solution grade polyvinyl chloride copolymers by suspension polymerization technique. More particularly, this invention relates to the preparation of light stable vinyl chloride/vinyl acetate copolymers, characterized by the ability to form relatively clear coating solutions, by suspension polymerization.

The term "solution" in reference to this category of resins generally refers to the application method for utilizing these resins. It also, however, in the past has been utilized to identify the polymerization procedure in that they are generally prepared by solution polymerization. These resins are characterized as high quality polymers substantially free from catalyst residue and substantially free from contaminants producing haze and low molecular weight fractions. While the solution grade resins are considerably more expensive than conventional polyvinyl chloride homopolymers, the advantages which they afford justify the additional expense involved. These resins are permanently internally plasticized thereby eliminating plasticizer extraction and migration problems with attendant film embrittlement. They are frequently used as top coats for plastisols for this reason, although where plasticizer content is not critical small quantities of plasticizer may be added to improve impact resistance. These resins are easily soluble in commercial solvents such as methyl isobutyl ketone and film formation occurs simply by solvent evaporation from the solution, requiring lower temperatures, shorter times and making possible in-field applications with ambient temperature drying. Very thin coatings are most uniformly applied from solution systems, thereby providing additional advantages.

Consistently clear, high-gloss coatings have been obtained by the use of these cleaner resins. They are conventionally pigmented by conventional techniques. These resins are widely used as maintenance coatings for protecting steel, coil coatings to prevent corrosion of sheet before fabrication and as prime and top coats. They are used as can coatings, as liners, as coatings in prefinished wood generally plywood for exterior and interior use, as coatings for textiles to provide coated fabrics with supple, soft, plush hand and drape demanded by fashions and wear characteristics, as paper and foil coatings; they find use for decorative markings in inks and linings for hot drink cups. As indicated above, they additionally serve as top coats for highly plasticized vinyl compositions and for rubber in polyurethane foams.

It has been well known and conventional in the art to prepare vinyl chloride/vinyl acetate copolymers and terpolymers by solution techniques to provide resins having exceptional clarity when dissolved in a suitable solvent.

Heretofore, the solution grade resins have been prepared in a solvent which is an expensive technique requiring solvent recovery and additional capital investment. Solvent loss in the recovery steps further reduces the efficiency of the operation. While suspension polymerization techniques have been long known, are more easily run and are less costly, suspension polymerized copolymers invariably contain contaminants, i.e., residual suspending agents and catalyst residue. These contaminants contribute to solution haze when the resin is dissolved in conventional solvents, such as methyl isobutyl ketone and methyl ethyl ketone. When such resin solutions are coated on the substrate and dried, these contaminants cause film cloudiness which is undesirable because of reduced coating effectiveness, film continuity, corrosion resistance, salt spray resistance, water resistance and the like, and exhibit relatively poor ultraviolet light stability.

In accordance with the provisions of the present invention, solution grade resins which yield clear solutions in conventional solvents and exhibit other properties exhibited by typical solution grade resins prepared via the expensive solution polymerization route are prepared by suspension techniques utilizing methyl cellulose as a suspending agent, a hot-reactive catalyst, and benzene or toluene as a chain transfer agent. These resins also exhibit enhanced light stability, not typical of conventional solution grade resins.

By the use of the term *hot-reactive catalyst* is meant those catalysts having a 10 hour half-life at a temperature below 60° C.

Exemplary of the hot catalysts are: $\alpha,\alpha'$-azobis ($\alpha$-$\gamma$-dimethyl valeronitrile), t-butyl peroxyprivalate, diisopropyl peroxydicarbonate, and the like.

By the term methyl cellulose suspending agent is intended both methyl cellulose per se and its derivatives, as for example hydroxypropylmethyl cellulose, which are conventionally known in the art. Methyl cellulose products are derived from and have the polymeric backbone of cellulose, a natural carbohydrate that contains a basic repeating structure of anhydroglucose units. The basic structure for methyl cellulose is as follows:

FORMULA I

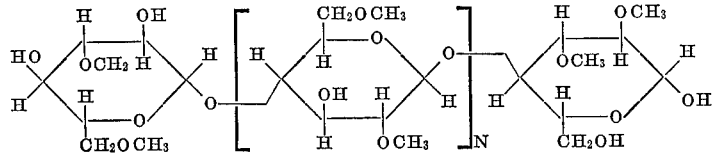

wherein N represents the number of repeating units. Methyl cellulose is conventionally prepared by swelling cellulose fibers obtained from cotton linters or wood pulp by a caustic soda solution to produce alkali cellulose. The alkali cellulose is subsequently treated with methyl chloride yielding the methyl ether of cellulose. The fibrous reaction product is purified and ground to a fine uniform powder or granule. Also intended to be within the definition of methyl cellulose are such derivatives as hydroxypropyl methyl cellulose. This derivative is generally prepared by reacting propylene oxide with methyl cellulose to obtain hydroxypropyl substituents on the anhydroglucose units. The substituent group

contains a secondary hydroxyl on the second carbon. Such products generally possess varying ratios of such hydroxy propoxyl substitution to methoxyl substitution. These materials are commercially available. The hydroxy propyl methyl cellulose has the formula set forth below:

FORMULA II

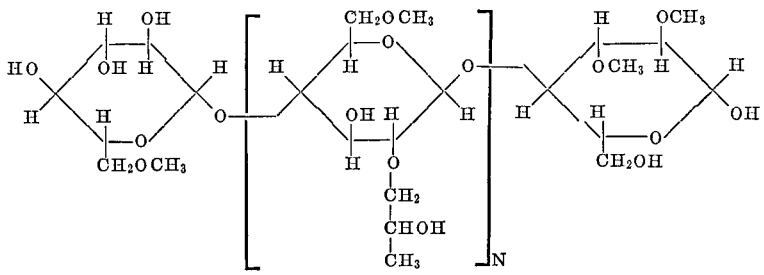

The methyl cellulose derivatives are available commercially under the name Methocel a registered trademark of Dow Chemical Company.

The chain transfer agent employed in the process of this invention is benzene or toluene and can be defined as an aromatic hydrocarbon containing from 6 to 7 carbon atoms inclusive.

In order to place the present invention in the proper perspective, a definition of conventional suspension polymerization and conventional solution polymerization is believed desirable.

Suspension polymerization refers to the polymerization of monomer dispersed in a suspension medium which is a non-solvent for both the monomer and the polymer, generally water utilizing normally a monomer soluble initiator. Suspension polymerization takes place within the monomer phase containing the polymer solution initiator. However, the use of the suspending medium assists in the dissipation of heat of reaction and therefore the polymerization reaction is easier to control. Suspension polymerization is generally accomplished by dispersing the monomer in the suspending medium either by constant agitation or by the use of a suspending agent or both. Various conventional suspending agents are known to the art. These known suspending agents include gelatin, hydroxy methyl cellulose, hydroxy ethyl cellulose, hydroxy propyl cellulose, carboxy methyl cellulose, talc, clay, polyvinyl alcohol and the like.

In distinction solution polymerization is a process which requires the use of an inert liquid, which is a solvent for the monomer compound used in forming the polymer, which solvent may or may not be a solvent for the prepared polymer. The catalyst or initiator if used is monomer soluble. Solution polymerization has the advantage that the solvent as in suspension polymerization assists in the dissipation of heat. The average molecular weight of the polymers as prepared by the use of solution polymerization are generally lower than those obtained by the use of other polymerization techniques and this method can be effective in the production of low molecular weight vinyl halide polymers. However, this process has the drawback that the solvent must be recovered in order to effect the necessary efficiency required in commercial practice. Both the suspension polymerization technique and the solution technique defined above are well known in the art.

The process of the present invention is particularly applicable to the preparation of vinyl chloride/vinyl acetate copolymers. These copolymers generally contain from about 1 to about 25% by weight vinyl acetate and preferably from about 13 to about 20% by weight vinyl acetate. The preferred copolymer range indicated provides exceptional coating grade resins. It should be noted also that the preferred copolymer range indicated above provides an exceptionally good balance of properties. As is well known, polyvinyl chloride homopolymer exhibits poor solubility in coating solvents such as methyl ethyl ketone, methyl isobutyl ketone and the like. Vinyl acetate increases the solubility but detracts from the toughness of the vinyl polymer. The range specified provides an excellent balance of solubility and toughness.

In preparing the vinyl chloride/vinyl acetate copolymers in the process of the present invention, the vinyl chloride and vinyl acetate are generally used such that the vinyl acetate is present in an amount of from about 13 to about 17% based on weight. The hot reactive catalysts of this invention are generally used in an amount from about 0.01 to about 0.3% by weight based upon the weight of the monomer and are preferably used in an amount from about 0.07 to about 0.11. The methyl cellulose suspending agent is generally used in an amount from about 0.03 to about 0.3% by weight based upon monomer. This material is generally available at the 1% aqueous solution and is utilized as such for convenience. It is preferred, however, that this methyl cellulose suspending agent be utilized in an amount of from about 0.09 to about 0.15% by weight based upon monomer. The aromatic hydrocarbon chain transfer agent as utilized in this invention is generally used in an amount of from about 0.5 to about 6.0% by weight based upon the weight of the monomer. It is preferred, however, that this transfer agent be utilized in an amount of from about 0.8 to about 3.0%.

It should be noted that the methyl cellulose suspending agent, the hot reactive catalyst and the aromatic hydrocarbon chain transfer agent are all critical in this invention in that if these agents are not used as specified, polymer solutions of relatively low haze and enhanced ultraviolet stability are not obtained.

The polymerization reaction of this invention is generally conducted at a temperature of from about 40° C. to about 90° C. although it is preferred to conduct this reaction at temperatures of from about 45° C. to about 75° C. While the polymerization reaction is generally substantially complete after about seven hours, the time of polymerization generally runs from about ten to twelve hours to insure adequate polymerization.

The polymerization reaction of this invention is conducted at superatmospheric pressure. This pressure is conveniently the vapor pressure of the vinyl chloride, vinyl acetate monomer composition at the specific temperature employed. For example, at 60° C., a mixture of 85 parts of vinyl chloride to 15 parts vinyl acetate affect a pressure of approximately 120 pounds per square inch. For convenience this pressure temperature composition relationship will be denoted as autogeneous pressure. If desired, however, higher pressures can be utilized by subjecting the reaction to the artificial effects of an inert gas under pressure, such as nitrogen. Such high pressure techniques, however, require the use of specialized equipment and, accordingly, are not preferred.

Attempts to employ other suspending agents such as are conventionally used in suspension polymerization have resulted in resins which do not yield the desired characteristics typified by conventional solution grade resins. This is particularly true in respect to the haze values exhibited by coatings of such resins and stability to ultraviolet radiation. Similarly, the employment of conventional non-hot catalysts fail to produce the desired resins as did the employment of chain transfer agents other than the aromatic hydrocarbons, benzene and toluene.

In Table I following is illustrated conventional and hot catalyst as defined within the terms of this invention, illustrating both structure and temperature half-life at ten hours.

and heated for specific periods of time. The oil bath should be continuously stirred and constant temperatures should be maintained, preferably within plus or minus 0.1° C. The tubes are thereafter withdrawn from the oil bath periodically and are cooled rapidly by immersion in ice water. The contents are analyzed for undecomposed catalyst. Iodiometric and infrared techniques can be employed for the analysis. The iodiometric technique consists of treatment of the organic catalyst solution with an inorganic iodide such as sodium or potassium iodide or aqueous hydriodic acid, followed by tritration of the liberated iodine with standard sodium thiosulfate solution. Catalysts resistant to iodide reduction can be assayed through the use of infrared differential analysis. In this analysis, standard molar solutions of each peroxide (0.025 m. to 0.4 m.) are prepared and standard curves of absorption vs. concentration and distance vs. concentration are obtained. The residual catalyst concentration can then be read directly from the spectra of partially decomposed samples.

TABLE I.—STRUCTURE AND HALF-LIFE (10 hour) TEMPERATURE
[Conventional and Hot Catalysts]

| Catalyst [1] | Structure | Temperature, ° C., half-life 10 hours |
|---|---|---|
| (1) Benzoyl peroxide | (phenyl)–C(=O)–O–O–C(=O)–(phenyl) | 72 |
| (2) Vazo | $H_3C-C(CH_3)(CN)-N=N-C(CH_3)(CN)-CH_3$ <br> 2,2'-azobisisobutyronitrile | 65 |
| (3) Lauroyl peroxide | $H_3C(CH_2)_{10}-C(=O)-O-O-C(=O)-(CH_2)_{10}CH_3$ | 62 |
| (4) Azo-52 | $(H_3C)_2CH-CH_2-C(CH_3)(CN)-N=N-C(CH_3)(CN)-CH_2-CH(CH_3)_2$ <br> $\alpha,\alpha'$-Azobis($\alpha,\gamma$-dimethylvaleronitrile) | 52 |
| (5) Lupersol-11 | $H_3C-C(CH_3)_2-O-O-C(=O)-C(CH_3)_3$ <br> t-Butyl peroxypivalate | 57 |
| (6) IPP | $(H_3C)_2CH-O-C(=O)-O-O-C(=O)-O-CH(CH_3)_2$ <br> Diisopropyl peroxydicarbonate | 46 |
| (7) Azo-33 | $(H_3C)_2C(OCH_3)-CH_2-C(CH_3)(CN)-N=N-C(CH_3)(CN)-CH_2-C(CH_3)(OCH_3)-CH_3$ <br> $\alpha,\alpha'$-Azobis ($\alpha,\gamma$-dimethyl $\gamma$ methoxyvaleronitrile) | 33 |

[1] Catalysts 1–3 Conventional; Catalysts 4–7 Hot Catalysts.

The ten hour half-life temperature of hot catalysts can be determined by preparing a benzene solution of the catalyst to be evaluated at a concentration of 0.2 mole of catalyst per liter of solvent. Ten milliliters of the catalyst solution are pipetted into test tubes suitably drawn for rapid sealing. The tubes preferably used are 16 by 150 millimeters. The filled tubes which preferably have about 5 milliliters of air space remaining are flushed with dry nitrogen, are sealed and immersed in a silicone oil bath

EXAMPLE 1

An autoclave was charged with the following ingredients:

0.20 parts of Dow 1242 Methocel, which is commercial methylcellulose;
0.25 part sodium bicarbonate (as buffer);
10.0 parts toluene transfer agent;
0.14 part tertiary butyl peroxypivalate hot catalyst;
320 parts deionized water.

The autoclave was sealed and evacuated and 124 parts of vinyl chloride and 26 parts of vinyl acetate were charged. The reaction was conducted for a period of 14 hours at a temperature of about 60° C. At the end of the reaction time, the polymer sample was recovered, washed in cold water and dried. This example was repeated identically, except that in place of t-butyl peroxypivalate catalyst, an equivalent amount of a 2,2'-azobisisobutyronitrile catalyst was utilized. The sample was additionally recovered and dried. The two samples were dissolved in methyl isobutyl ketone to a concentration of 20%. Similarly, a sample of commercial solution grade vinyl chloride/vinyl acetate resin of similar composition was dissolved to a similar concentration. The three samples were evaluated for haze value by sight. Table below shows the results of this determination.

TABLE

| Catalyst used in Example 1: | 20% in MIBK—Haze value det. by sight |
|---|---|
| (1) t-Butyl peroxypivalate | Clear, translucent-haze value range 15–20. |
| (2) 2,2'-azobisisobutyronitrile | Slight haze, slightly opaque-haze value range 25–35. |
| (3) VYHH, Union Carbide Solution Resin | 8–9. |

The three polymers were exposed to ultraviolet radiation for a period of from 1,000 to 1,300 hours and examined for color. Sample 2 above proved most stable. Sample 1 exhibited enhanced stability. Sample 3 exhibited relatively low stability.

Utilizing the identical procedure as set forth in Example 1, polymerization reactions are conducted varying the chain transfer agent. Benzene is found to be equivalent to toluene in haze and stability. Xylene and mesitylene are not.

What is claimed is:

1. A method for the suspension polymerization of vinyl chloride/vinyl acetate copolymers which comprises polymerizing vinyl chloride with from about 1 to about 25% by weight vinyl acetate in the presence of from about 0.01 to about 0.3% by weight based upon weight of monomer of a hot catalyst having a ten hour half-life temperature of less than 60° C., from about 0.03 to about 0.3% by weight based upon monomer of a methyl cellulose suspending agent and benzene or toluene as a chain transfer agent, at a temperature of from about 0° C. to about 90° C.

2. The method of claim 1 wherein the hot catalyst is utilized in an amount of from about 0.07 to about 0.11% by weight, the methyl cellulose suspending agent is utilized in an amount of from 0.09 to about 0.15% by weight and the chain transfer agent is toluene utilized in an amount of from about 0.8 to about 3.0% by weight.

3. The method of claim 1 wherein the polymerization is conducted at a temperature of from about 45 to about 75° C.

4. The method of claim 1 wherein the hot catalyst utilized is α,α'-azobis (α,γ-dimethyl valeronitrile).

5. The method of claim 1 wherein the hot catalyst utilized is tertiary butyl peroxypivalate.

6. The method of claim 1 wherein the hot catalyst utilized is diisopropyl peroxydicarbonate.

7. The method of claim 1 wherein the hot catalyst utilized is α,α' - azobis (α,γ-dimethyl γ methoxyvaleronitrile.

8. The method of claim 1 wherein the suspending agent utilized is a methyl cellulose having the formula:

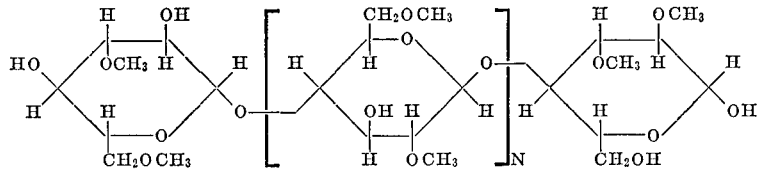

wherein N designates the number of repeating units.

9. The method of claim 1 wherein the methyl cellulose suspending agent has the formula:

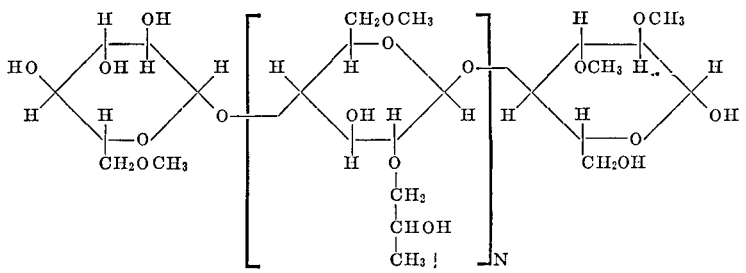

wherein N designates the number of repeating units.

10. The method of claim 1 wherein the chain transfer agent is benzene.

References Cited
UNITED STATES PATENTS

| 3,004,009 | 10/1961 | Dell | 260—86.3 |
| 3,293,199 | 12/1966 | Abercrombie | 260—17 |
| 3,388,110 | 6/1968 | Kuhlkamp | 260—85.7 |
| 3,420,807 | 1/1969 | Harrison | 260—92.8 |

(Other references on following page)

FOREIGN PATENTS 1,493,610   7/1967   France _____ 260—87.1

OTHER REFERENCES

Schildknecht, C. E., Polymer Processes, Interscience Publishers, N.Y. (1956), vol. X, pp. 176, 180.

JAMES A. SEIDLECK, Primary Examiner

C. A. HENDERSON, Jr., Assistant Examiner

U.S. Cl. X.R.

260—17, 32.8, 80